BIRD & WELD.
Smut Machine.
No 2,513.
Patented March 28, 1842.
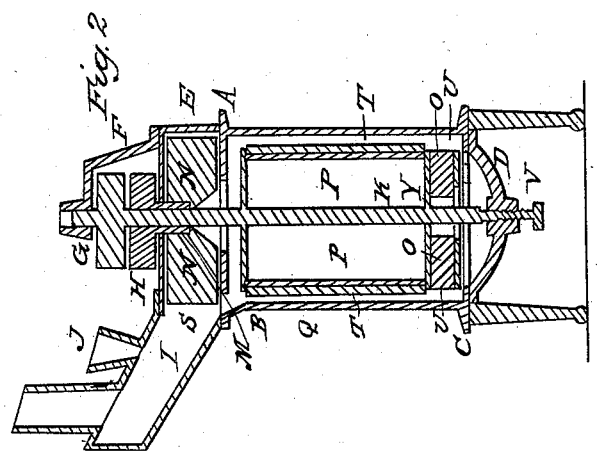
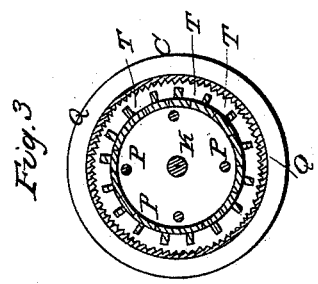
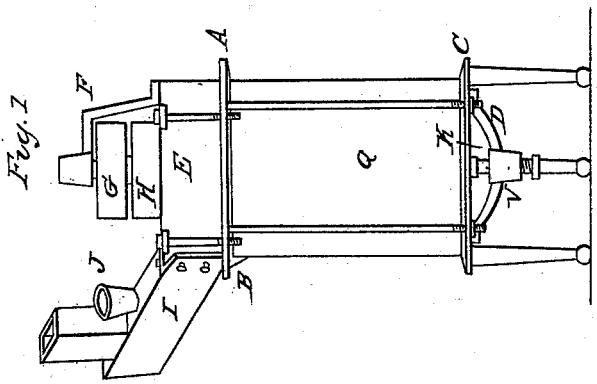

UNITED STATES PATENT OFFICE.

J. N. BIRD AND E. D. WELD, OF TRENTON, NEW JERSEY.

MACHINE FOR CLEANING GRAIN.

Specification of Letters Patent No. 2,513, dated March 28, 1842.

*To all whom it may concern:*

Be it known that we, JOSIAH N. BIRD and EDWARD D. WELD, of the city of Trenton, county of Mercer, and State of New Jersey, have invented a new and useful Machine for Cleaning Grain, such as Wheat, Rye, Buckwheat, and other Small Grain; and we do hereby declare that the following is a full and exact description thereof, reference being had to the annexed drawings of the same, making part of this specification.

Figure 1 is a perspective view. Fig. 2 is a vertical section; Fig. 3 a horizontal section.

Similar letters refer to corresponding parts.

Our machine may be made of any size required say about 18 inches extreme diameter, and about 36 inches extreme height. It stands in a vertical position and consists of two cylinders, one placed within the other, the outer one stationary and the inner one revolving. The external or stationary cylinder or shell Q is formed with four cast iron staves (which are fluted outside and inside lengthwise or vertically) one stave having a tube or pipe B extending outside of the top flanch to receive the grain. The flanch C at the lower end of the machine extends about 3 inches outside of the staves and projects inward about one inch within the shell. To this flanch is bolted a bale D which hangs about 4 inches below the flanch having a steel step V upon which the foot of the shaft K of the inner cylinder revolves. The flanch A at the upper end is the same diameter outside as the one at the lower end closing up that end of the cylinder with the exception of a hole R in the center about 6 inches in diameter. Upon the top of this flanch and connected to it by bolts we place the pan box E which is about 16 inches in diameter and about 6 inches high. The top of the pan box is closed with the exception of a hole in the center sufficiently large to allow the shaft of the revolving cylinder and the hub or sheath to which the pan is attached to pass through.

The fan box has an opening S about 6 inches square out of which the air is driven by the pan when in motion. This opening must be directly over the pipe or tube B which is on the side of the outer cylinder at the top thereof. On the top of the fan box we fasten by means of bolts the housing or box E to receive the upper end of the shaft of the revolving cylinder which housing is elevated sufficiently to receive the pulleys G, H, which drive the fan and the revolving cylinder below the journal.

The internal or revolving cylinder P is made of sixteen or more or less staves P each having a beater T projecting or radiating outward from the circumference thereof of about three fourths of an inch in width of the length of the stave which we make about 16 inches said stave being connected to two heads by means of a groove in each head and bolts extending through the said heads. This cylinder is then fastened to a shaft K having a steel foot resting on the steel step in the bale and extending upward to the box or housing on the top of the fan box. Near the top of the shafts a pulley C is fastened to the shaft for the purpose of giving motion to the revolving cylinder. Below this pulley we place on the shaft a revolving hub or sheath M extending from the bottom of the pulley to an inch or two below the center of the fan box upon the lower end of which hub or sheath we attach the fan N (which should be as large as the box will admit) and upon the upper end of said hub we attach a pulley H for the purpose of giving motion to the fan. This hub M being round and hollow and turned to the left by a band passed around its pulley H and the shaft K being turned in the center of the same to the right by a band passed around its pulley G will cause the fan N and beaters T to turn in contrary directions but they may both be made to turn in the same directions, at different velocities, by changing the direction of the movement and the diameter of the pulleys or the other gearings or by means of one pulley or cogged gearing or any suitable kind of gearing.

Upon the lower end of the revolving cylinder we attach a fan O having four wings with a circular flanch or plate V attached to the lower edges of the wings taking in air at the center and discharging it at the outside.

When the machine is put into operation we attach a trunk or conductor I to the opening on the side of the fan box to carry off the dirt, chaff, &c. This conductor should be inclined upward at such an angle that should any grain be blown or dashed away from the pipe J which admits it into the machine it will fall back into the cylinder. Through the top of this conductor we make an opening of about two inches in diameter through which the grain passes into the machine through a pipe J of a funnel shape.

The inner or revolving cylinder P being put in motion at any required velocity to beat the grain and the fan N being put in motion at such velocity as shall create a current of air sufficient to carry off the dirt, the grain is then admitted at the opening J in the trunk or conductor I is partly cleaned by passing through the current of air, passes into the machine where all dirt, smut, white caps, &c., are separated from the grain by means of the beaters T and ribs of the shell Q and blown away through the hole at the top of the machine and out of the conductor at I while the grain by means of its superior gravity passes out at the bottom of the machine through the center thereof which is open. By this arrangement we are enabled to beat and blow as much or as little as will clean perfectly and without injury the toughest and dirtiest or the most tender grains. When it is desired to run the fan and cylinder at the same velocity we cast off one belt connect the two pulleys (when of like diameter) and both will revolve together. The machine is made of cast iron entirely except the bolts and shaft.

Operation: The machine being put in motion the upper fan will turn in one direction at the rate of about 700 revolutions per minute while the beaters will turn in the same or in an opposite direction at the rate of about 500 revolutions per minute, variable at pleasure according to the kind of grain to be cleaned—the upper fan exhausting the air in the fan box and driving it out through the inclined trunk while the fan box is kept constantly furnished with a fresh supply of air drawn in through the opening Y in the center of the lower plate U of the lower fan by the radiating wings arranged between said lower plate and the circular solid plate forming the bottom of the inner cylinder—the air being caused to pass between said plates and the sides of the outer and the inner cylinders to the fan case—the aforesaid lower plate of the lower fan with its aperture in the center being a valuable part of the machine. The grain to be cleaned is then introduced to the beaters through the funnel and tube passing through or across the current of air in the inclined trunk which carries off the loose particles of dirt, chaff, dust, &c., while the grain descends to the beaters which take and throw it off violently against the ribs of the shell or stationary cylinders which causes the smut and dirt to be separated from the grain while the upward current of air carries with it the said smut, &c., out through the inclined trunk the sound grain in a cleaned state from its greater weight descending and passing out at the space between the two cylinders at the bottom thereof.

It will be perceived from the foregoing description that with this machine buckwheat or newly harvested wheat or any tender grain may be perfectly cleaned without injury to the grain by running the beaters slow while the fan by running independently thereof may receive any desired velocity for increasing the current of air through and out of the machine.

What we claim as our invention and which we desire to secure by Letters Patent consist is—

The mode of combining the fan N on the upper end of the revolving cylinder with said cylinder viz by constructing it with a hollow axle through which the shaft K passes and providing it with a separate pulley H arranged immediately below the pulley for driving the aforesaid cylinder by means of which arrangement a greater velocity and in a contrary direction may be given to the fan than if fixed permanently on the shaft K as heretofore, or allowing, if necessary, by means of a broad band, of their being driven together in the same direction all as herein set forth.

JOSIAH N. BIRD.
EDW. D. WELD.

Witnesses:
SAML. EVANS,
HENRY R. EVANS.